United States Patent
Fujiyama (10) Patent No.: US 10,423,145 B2
(45) Date of Patent: Sep. 24, 2019

(54) NUMERICAL CONTROLLER CAPABLE OF CHANGING MACHINING CONDITION IN ACCORDANCE WITH MACHINING INFORMATION

(71) Applicant: FANUC CORPORATION, Minamitsuru-gun, Yamanashi (JP)

(72) Inventor: Jirou Fujiyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 228 days.

(21) Appl. No.: 15/442,994

(22) Filed: Feb. 27, 2017

(65) Prior Publication Data

US 2017/0248934 A1 Aug. 31, 2017

(30) Foreign Application Priority Data

Feb. 29, 2016 (JP) .................... 2016-037375

(51) Int. Cl.
| | | |
|---|---|---|
| *G06F 19/00* | (2018.01) | |
| *G05B 19/23* | (2006.01) | |
| *G05B 19/4099* | (2006.01) | |
| *G05B 19/4093* | (2006.01) | |

(52) U.S. Cl.
CPC ......... *G05B 19/23* (2013.01); *G05B 19/4099* (2013.01); *G05B 19/40937* (2013.01); *G05B 2219/35134* (2013.01); *G05B 2219/36088* (2013.01); *G05B 2219/36504* (2013.01)

(58) Field of Classification Search
CPC .................................................. G05B 19/23
USPC ....................................................... 700/189
See application file for complete search history.

(56) References Cited

U.S. PATENT DOCUMENTS

| 4,209,847 A * | 6/1980 | Noda ................. G05B 19/414 |
| | | 700/181 |
| 5,911,125 A | 6/1999 | Fujibayashi et al. |
| 6,501,997 B1 | 12/2002 | Kakino |
| 2002/0138171 A1 * | 9/2002 | Fukutani ................. B23Q 15/12 |
| | | 700/188 |

(Continued)

FOREIGN PATENT DOCUMENTS

| JP | 62208857 A | 9/1987 |
| JP | 05134722 A1 | 6/1993 |

(Continued)

OTHER PUBLICATIONS

Notification of Reasons for Refusal for Japanese Application No. 2016-037375, dated Feb. 20, 2018 with translation, 5 pages.

(Continued)

*Primary Examiner* — Md Azad
(74) *Attorney, Agent, or Firm* — RatnerPrestia (57) ABSTRACT

A numerical controller reads out an instruction block included in a machining program, obtains machining information indicating a feature of a tool path instructed by the read instruction block, and stores a machining conditions related to a movement of a tool in association with the obtained machining information. Further, the machining information obtained together with the instruction block is determined, and a machining condition in the movement of the tool instructed by the instruction block is changed based on the determined machining information and the stored machining condition.

5 Claims, 5 Drawing Sheets

(56) References Cited

U.S. PATENT DOCUMENTS

| | | | | |
|---|---|---|---|---|
| 2009/0228135 A1* | 9/2009 | Nakamura | ............ | G05B 19/409 |
| | | | | 700/173 |
| 2015/0134105 A1* | 5/2015 | Iuchi | .................. | G05B 19/4155 |
| | | | | 700/186 |
| 2016/0363927 A1* | 12/2016 | Yoshida | ................... | B23Q 5/18 |

FOREIGN PATENT DOCUMENTS

| | | | |
|---|---|---|---|
| JP | 05220626 A | 8/1993 |
| JP | 11156672 A | 6/1999 |
| JP | 3647043 B2 | 2/2005 |
| JP | 2009-076018 A | 4/2009 |

OTHER PUBLICATIONS

Japanese Decision to Grant a Patent for Japanese Application No. 2016-037375, with English translation, dated Sep. 25, 2018—6 pages.

* cited by examiner

FIG.1

MACHINING PROGRAM

| | |
|---|---|
| G01 F_ | |
| N1 X_ App; | APPROACH |
| N2 X_; | |
| Air S; | AIR CUT START |
| N3 Z_ Ret; | RETRACTION |
| N4 X_; | |
| N5 Z_ App; | APPROACH |
| Air E | AIR CUT END |
| N6 X_; | |
| Pic S, Air S; | PICK FEED START, AIR CUT START |
| N7 X_; | |
| N8 Y_; | |
| N9 X_; | |
| Pic E, Air E; | PICK FEED END, AIR CUT END |
| N10 X_; | |
| : | |

FIG.3

| MACHINING CONDITION | | MACHINING INFORMATION | | | |
|---|---|---|---|---|---|
| | CUTTING FEED /RAPID-TRAVERSE | APPROACH | RETRACTION | PICK FEED | AIR CUT |
| | | CUTTING FEED | RAPID TRAVERSE | CUTTING FEED | RAPID TRAVERSE |
| OVERRIDE | | — | 120% | 70% | 200% |
| SMOOTHING | | ON | OFF | OFF | OFF |
| LIFETIME COUNTER | | OFF | OFF | ON | OFF |

NUMERICAL CONTROLLER CAPABLE OF CHANGING MACHINING CONDITION IN ACCORDANCE WITH MACHINING INFORMATION

BACKGROUND OF THE INVENTION

1. Field of the Invention

The present invention relates to numerical controllers, and particularly, to a numerical controller capable of changing machining conditions in accordance with machining information.

2. Description of the Related Art

An end position and a speed of a tool are instructed in a machining program, and the machining is executed based on a tool path. A general machining program does not describe additional information related to an aim or a situation of a movement of the tool and a feature of the tool path such as a setting at the program producing including blocks by a CAM in an instruction of each block.

As to the conventional technology for instructing the details of a tool movement in the instruction of each block in the machining program, for example, Japanese Patent No. 3647043 discloses a technology of performing acceleration/deceleration control using an instruction program including, within one block, a plurality of acceleration/deceleration start positions, time constants of the acceleration/deceleration control to be started in the acceleration/deceleration start positions, and target speeds by the acceleration/deceleration.

According to the technique disclosed in Japanese Patent Application Laid-Open No. 2009-076018, the machining is made possible in the acceleration/deceleration setting suitable for a desired location, for example, by performing deceleration in a location required of accuracy by adding an instruction for changing an acceleration/deceleration time constant.

Figure 5:
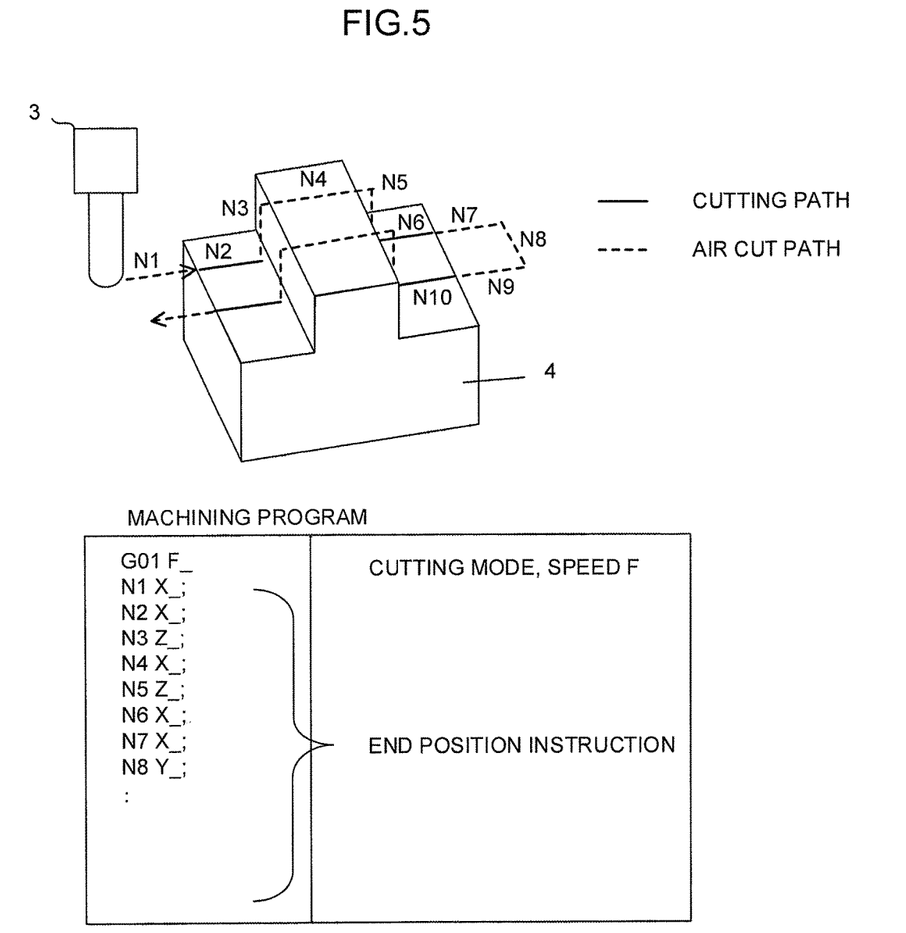
FIG. 5 is a diagram illustrating an example of a machining program by the conventional technology.

In a machining program illustrated as an example in FIG. 5, coordinate values are uniformly instructed in Blocks N1 to N10, but each block is characterized by a movement aim and a movement situation of the tool 3. For example, a path in a dotted line is an air cut section, Block N1 is an approach section in which the tool approaches a workpiece, and Blocks N7 to N9 are pick feed sections. There occurs a problem with a detailed adjustment to the settings of numerical control such as a machining speed in accordance with the feature of the tool path such as the movement aim and the movement situation of the tool, but according to the general machining program, where to change the setting of the numerical control cannot be determined by the program alone. In addition, it is impossible to make an adjustment of the setting of the numerical control in a lump for locations having the same feature of the tool path.

As to this problem, in the technology according to Japanese Patent No. 3647043 and Japanese Patent Application Laid-Open No. 2009-076018, the movement of the tool in each block can be in detail instructed on some level, but that instruction is limited to direct and specific matters, and does not include information related to abstract features of the tool path such as the movement aim and situation of the tool. Therefore even if these conventional technologies are introduced, it cannot be determined where to change the setting in the machining program in accordance with the feature of the tool path such as the movement aim and movement situation of the tool, and the locations having the same feature of the tool path cannot be collectively adjusted.

SUMMARY OF THE INVENTION

Therefore an object of the present invention is to provide a numerical controller that can minutely control a movement of a tool in accordance with a feature of a tool path.

A numerical controller according to the present invention controls a machine equipped with a tool, based on a program including an instruction block that instructs a movement of the tool, and includes: an instruction analyzing unit configured to read out the instruction block and obtain machining information that is information indicating a feature of a tool path instructed by the instruction block; a machining condition storing unit configured to store a machining condition that is a condition related to the movement of the tool in association with the machining information; a machining information determining unit configured to determine the machining information obtained together with the instruction block; and a machining condition changing unit configured to change the machining condition in the movement of the tool instructed by the instruction block, based on the machining information determined by the machining information determining unit and the machining condition stored in the machining condition storing unit.

The numerical controller may further include a machining condition setting unit configured to set the machining condition stored in the machining condition storing unit.

The feature of the tool path may include any one of: a pick feed as an aim of the movement of the tool instructed by the instruction block; an approach as an aim of the movement of the tool instructed by the instruction block; a retraction as an aim of the movement of the tool instructed by the instruction block; an air cut situation as the movement of the tool instructed by the instruction block; a machining movement in a corner part as the movement of the tool instructed by the instruction block; a machining movement for a final shape of a workpiece as the movement of the tool instructed by the instruction block; a movement in a boundary part between a curved face and a planar face as the movement of the tool instructed by the instruction block; and machining precision and tolerance of a workpiece, a shape of a tool or a kind of a tool set in a CAM at a time of creation of the program.

The machining condition may include at least any one of a cutting-feed/rapid-traverse condition, an override condition, an acceleration/deceleration parameter condition, an on/off condition of smoothing, a tolerance condition of smoothing, a compensation function condition of a tool, a change/compensation condition of an end position, an on/off condition of a lifetime counter, a spindle rotational speed, and a feed speed.

The machining information may be directly described as a symbol in the program.

Since it is possible to minutely perform the numerical control in accordance with the feature of the machining by the present invention, the present invention can contribute to the machining in a high speed, with high precision and of high grade. In addition, since the setting of the numerical control is adjustable for each feature, the movement of the tool instructed by each block can be flexibly and simply adjusted to prevent moving-back to a CAM.

DETAILED DESCRIPTION OF THE PREFERRED EMBODIMENTS

A numerical controller of the present invention ca change machining conditions in accordance with a plurality of pieces of machining information obtained together with a machining program. The machining information introduced by the present invention is not a G code or M code, but is obvious information in the process of examining the tool path and is information lost in the existing machining program at the time of converting the tool path into the machining program, and includes information representing features of the tool path, such as information indicating an aim of a movement instruction and a situation of the tool in each block included in the machining program or setting information of a CAM at a time of creation of a machining program.

Figure 1:
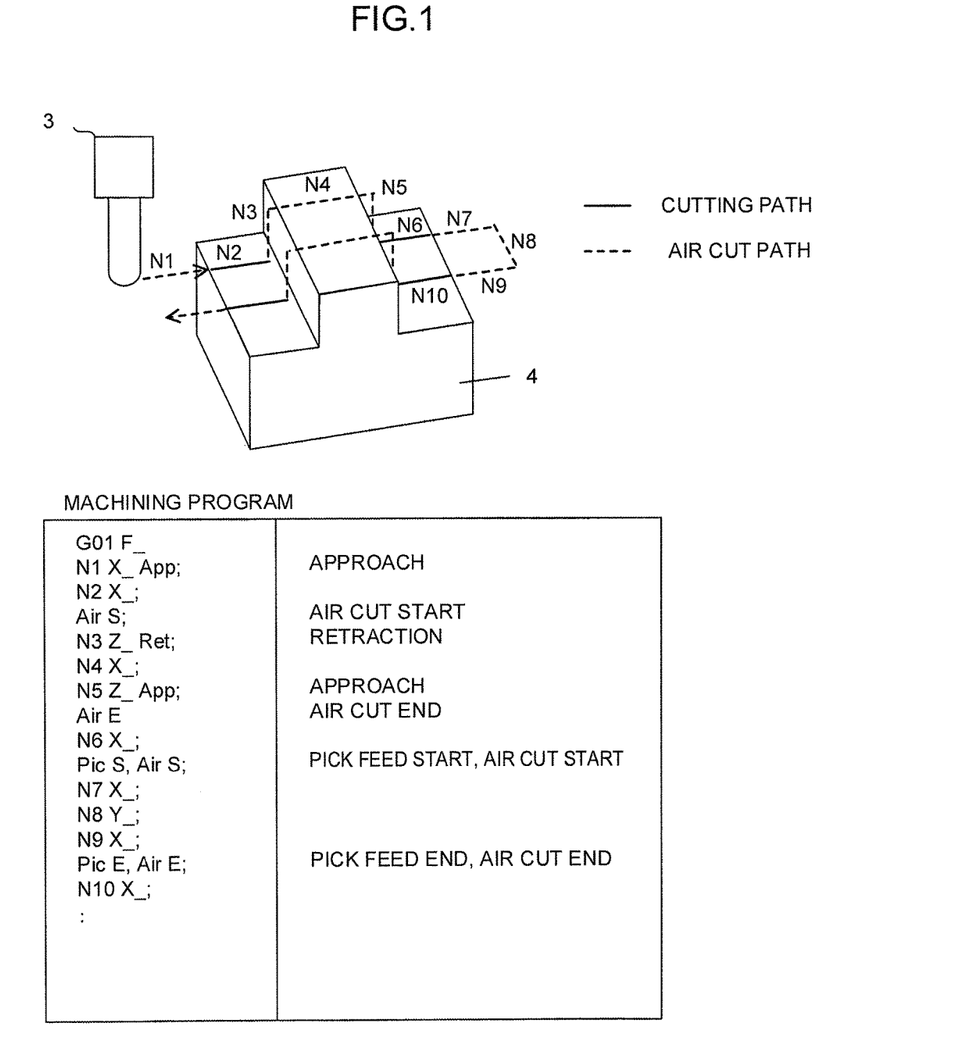
FIG. 1 is a diagram explaining a method of changing a machining condition in accordance with machining information of the present invention.

FIG. 1 illustrates an example of describing a machining program illustrated in FIG. 5 together with the machining information included therein.

In the machining program illustrated in FIG. 1, machining information App added to Block N1 indicates that Block N1 is an approach section where a tool 3 approaches a workpiece 4, and machining information Ret added to Block N3 indicates that Block N3 is a retraction section where the tool 3 is separated from the workpiece 4. In addition to describing the machining information in the program as one-shot instructions as described above, it is possible to describe the machining information as modal instructions that are a start instruction S and an end instruction E such that the machining information can be described between Block N2 and Block N3, between Block N5 and Block N6, between Block N6 and Block N7 and between Block N9 and Block N10. In the modal instruction, the machining information is added to each block described between the start instruction and the end instruction. When the movement of the tool 3 in each block is carried out, the machining condition is changed based on the machining information added to each block.

Figure 2:
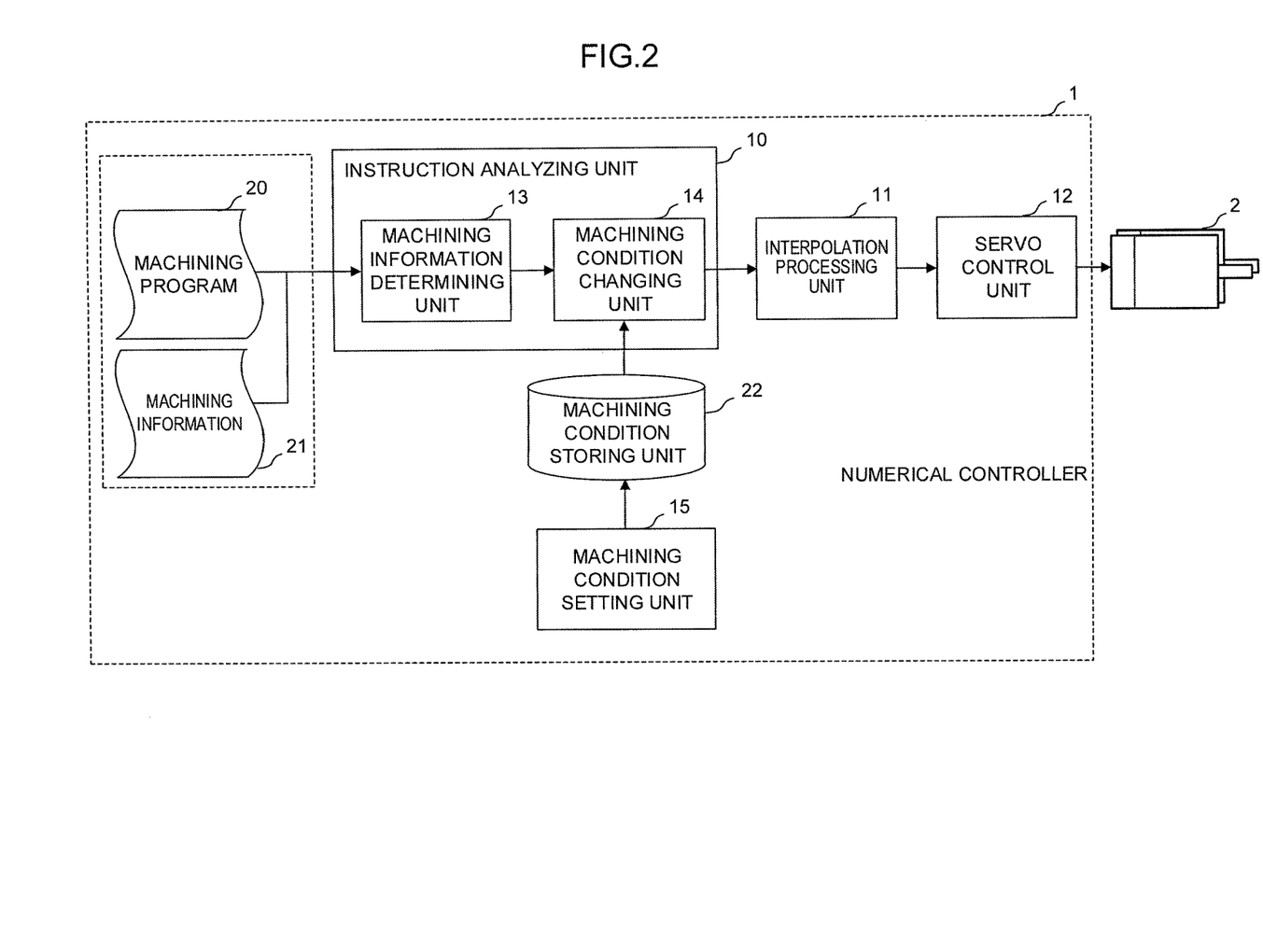
FIG. 2 is a functional block diagram of a numerical controller according to an embodiment of the present invention.

FIG. 2 is a schematically functional block diagram of the numerical controller according to the embodiment of the present invention. The numerical controller 1 of the present embodiment includes an instruction analyzing unit 10, an interpolation processing unit 11, a servo control unit 12, and a machining condition setting unit 15. The instruction analyzing unit 10 includes a machining information determining unit 13 and a machining condition changing unit 14.

The instruction analyzing unit 10 reads out blocks included in a machining program 20 stored in a memory (not shown), analyzes an instruction based on the block, and generates movement data for controlling a servo motor 2 driving each axis provided in a machine as a control target, and outputs the generated movement data to the interpolation processing unit 11. The instruction analyzing unit 10 generates the movement data according to a machining condition changed by the machining information determining unit 13 and the machining condition changing unit 14 to be described later, based on machining information 21 obtained together with the block read out by the instruction analyzing unit 10.

The interpolation processing unit 11 generates, based on movement data generated and output by the instruction analyzing unit 10, interpolation data as a point for each interpolation cycle on an instruction path by the movement data, and performs adjustment (acceleration/deceleration processing) of a speed of each axis for each interpolation cycle with respect to the generated interpolation data. The interpolation data adjusted for each interpolation cycle is output to the servo control unit 12 as a position instruction instructing a position (movement amount) of a tool for each interpolation cycle. The servo control unit 12 controls a servo motor 2 driving each axis provided in a machine (not shown) as a control target based on the interpolation data output from the interpolation processing unit 11.

The machining information determining unit 13 analyzes the machining information 21 obtained together when the instruction analyzing unit 10 reads out blocks included in the machining program 20 stored in a memory (not shown), determines the feature of the tool path of each block by the machining information 21, and outputs the determined feature of the tool path to the machining condition changing unit 14. The machining information 21 may be described as the one-shot instruction or the modal instruction in the machining program 20 as described above, or may be managed on the memory as different data including information associated with each block. In the middle of performing each block included in the machining program 20, machining information of the block may be instructed from outside by a different signal.

The information indicating the feature of the tool path of each block determined based on the machining information 21 by the machining information determining unit 13 may include information indicating that the movement of the tool instructed by the block aims at a pick feed (feeding a tool by a cut interval), aims at an approach (approach of a tool to a workpiece), aims at a retraction (separation of a tool from a workpiece), is in an air cut situation (empty cutting by a tool), is a machining movement in a corner part, is a machining movement for a final shape of a workpiece, and is a movement in a boundary part between a curved face and a planar face, information indicating predetermined machining precision and tolerance of a workpiece, a shape of a tool or a kind of a tool set in a CAM at the time of creating a machining program including the block, and the like. The features of the tool path are not limited thereto, but may be defined in accordance with a machine as a control target or a feature of the machining as needed.

The machining condition changing unit 14 refers to the machining condition storing unit 22 based on the feature of the tool path indicated by the machining information of each block determined by the machining information determining unit 13 to determine a machining condition at the time of executing the block.

Figure 3:
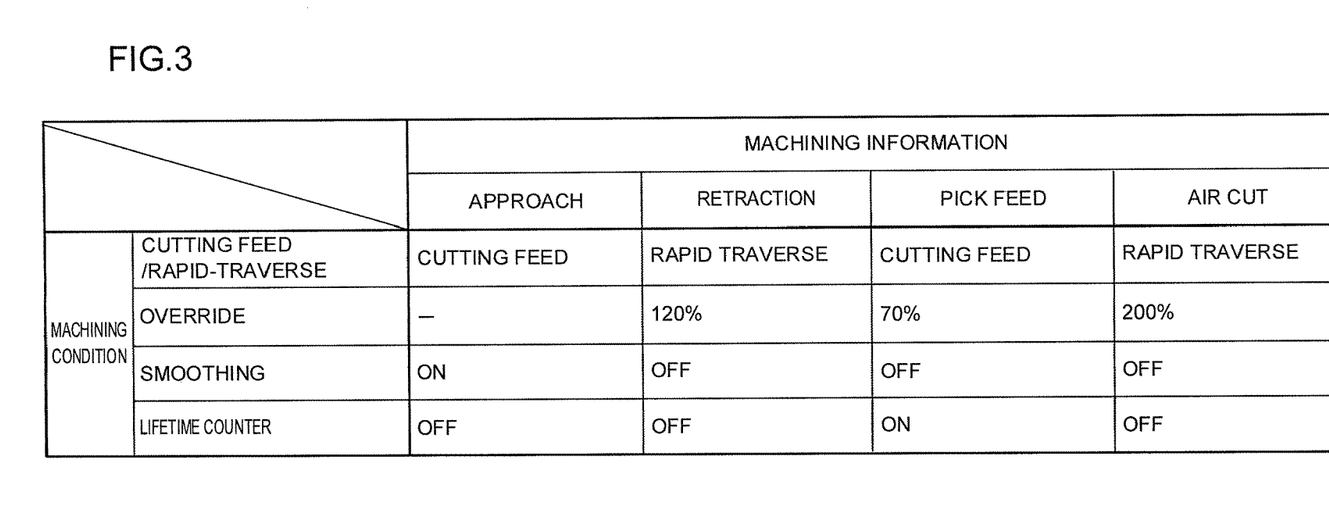
FIG. 3 is a diagram illustrating an example of machining conditions stored in a machining condition storing unit in the numerical controller in FIG. 2.

FIG. 3 is a diagram illustrating an example of machining conditions stored in the machining condition storing unit 22.

The machining condition is set in the machining condition storing unit 22, associated with a control mode in the feature of each tool path indicated by the machining information. In an example in FIG. 3, for easy understanding, items of the machining conditions are limited to four conditions of a cutting-feed/rapid-traverse condition, an override condition, an on/off condition of smoothing and an on/off condition of a lifetime counter. For example, as to the machining conditions in a case where the feature of the tool path is the approach, the cutting-feed/rapid-traverse condition is set to "cutting", the on/off condition of smoothing is set to "ON" and the on/off condition of the lifetime counter is set to "OFF", and the change is not set to the override condition. An example of machining conditions stored in the machining condition storing unit 22 may include an acceleration/deceleration parameter condition, a tolerance condition of smoothing, a compensation function condition of a tool, a change/compensation condition of an end position, a spindle rotational speed, a feed speed and the like in addition to the above, but is not limited thereto and the machining condition may be defined in accordance with a machine as a control target or a feature of the machining as needed.

In this way, when the machining information 21 is instructed by the operations of the machining information determining unit 13 and the machining condition changing unit 14, the control mode of the machining condition is automatically switched and the machining condition stored for each of the control modes is applied. When the control mode ends, the machining condition set in the machining program 20 or the numerical controller 1 is again applied. As to the item where the machining condition is not set, such as the override condition in a case where the feature of the tool path in FIG. 3 is the approach, when the control mode ends, the original machining condition is directly utilized.

In a case where two or more different features of a tool path are determined to be overlapped to a block by the machining information determining unit 13, the machining condition changing unit 14 may determine the priority order based on a relation of instructions in the machining information 21 in the machining program 20 to determine a machining condition to be applied. For example, in the machining program in FIG. 1, Block N3 may apply the machining condition determined based on the retraction that is the machining information instructed by the one shot instruction in priority to the machining condition determined based on the air cut that is the machining information instructed by the modal instruction. In a case where different features of a tool path instructed by the modal instruction overlap each other, the machining condition determined based on a machining condition to be instructed later may be applied with priority.

As another operation example of the machining condition changing unit 14 in a case where two or more different features of a tool path are determined to be overlapped to a block by the machining information determining unit 13, a feature of the tool path to be prioritized by the setting of the numerical controller 1 may be designated. For example, with regard to the numerical controller 1, in a case where the priority order of control modes is set as follows: 1. an approach, 2. a retraction, 3. a pick feed, 4. an air cut . . . , a machining condition to be determined based on the feature pick feed of the tool path may be prioritized in Blocks N7 to N9 in the machining program in FIG. 1.

In a case where different features of a tool path overlap each other, the setting of low-priority conditions may be used with regard to machining conditions not set in the prioritized feature of the tool path.

The machining condition setting unit 15 receives input from an operator or the like to set and change a machining condition to be stored in the machining condition storing unit 22.

Figure 4:
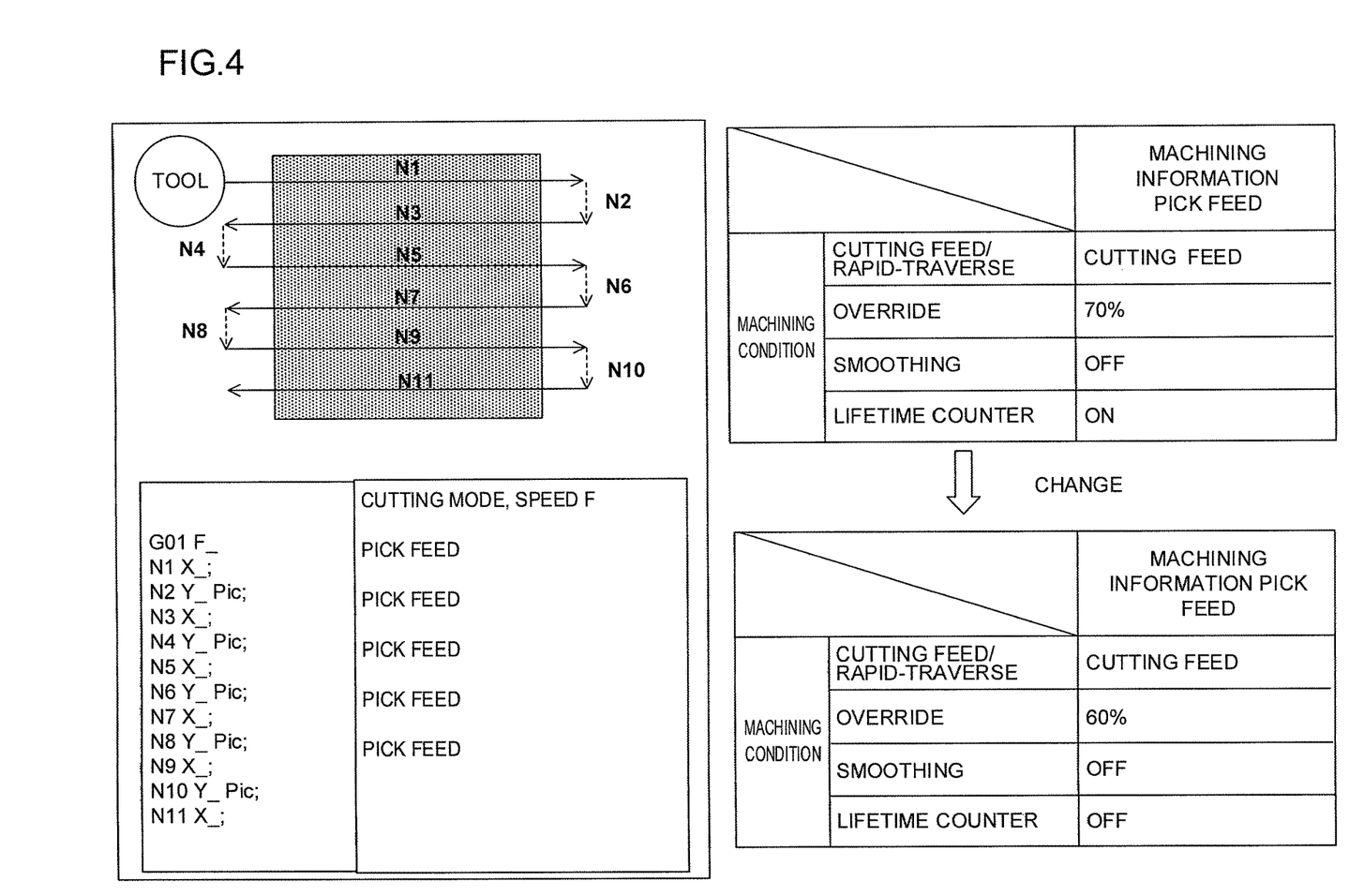
FIG. 4 is a diagram illustrating an example of collectively changing the machining conditions in a machining condition setting unit in the numerical controller in FIG. 2.

FIG. 4 illustrates an example in which an operator changes machining conditions of the pick feed by the machining condition setting unit 15.

As illustrated in FIG. 4, in a case where the same machining information 21 is set to each of a plurality of blocks in the machining program, an operator changes the machining conditions stored in the machining condition storing unit 22 through the machining condition setting unit 15, thus making it possible to collectively change the respective machining conditions in the plurality of blocks to which the same machining information is set.

As described above, the embodiment of the present invention is explained, but the present invention is not limited to the above examples of the embodiment, and can be carried out in various forms with optional changes.

For example, two or more pieces of the same machining information may be formed so that they are distinguished from each other. For example, even when the machining information indicates that the tool movement location is the same approach section, in a case where different machining conditions are desired to be set in a case of an approach from an X axis and in a case of an approach from a Z axis, the numbers (for example, App1 and App2) for identification may be assigned to the pieces of the machining information at a time of creation of a machining program, thus making it possible to apply different machining conditions in accordance with the numbers. In this case, the machining condition in accordance with each approach is set to the machining condition storing unit 22.

The invention claimed is:

1. A numerical controller for controlling a machine equipped with a tool, based on a program including an instruction block that instructs a movement of the tool, comprising:
 a processor configured to read out the instruction block and obtain machining information that is information indicating a feature of a tool path instructed by the instruction block;
 a memory accessible by the processor configured to store a machining condition that is a condition related to the movement of the tool in association with the machining information, wherein the machining condition includes a cutting-feed/rapid-traverse condition;
 wherein the processor is further configured to:
  analyze the machining information obtained together with the instruction block to determine the feature of the tool path instructed by the instruction block;
  change the machining condition in the movement of the tool instructed by the instruction block, based on the machining information and the machining condition; and
  generate movement data for controlling the movement of the machine equipped with the tool according to the changed machining condition.

2. The numerical controller according to claim 1, wherein the processor is further configured to set the stored machining condition.

3. The numerical controller according to claim 1, wherein the feature of the tool path includes any one of:
 a pick feed as an aim of the movement of the tool instructed by the instruction block;
 an approach as an aim of the movement of the tool instructed by the instruction block;
 a retraction as an aim of the movement of the tool instructed by the instruction block;
 an air cut situation as the movement of the tool instructed by the instruction block;
 a machining movement in a corner part as the movement of the tool instructed by the instruction block;

a machining movement for a final shape of a workpiece as the movement of the tool instructed by the instruction block;

a movement in a boundary part between a curved face and a planar face as the movement of the tool instructed by the instruction block; and machining precision and tolerance of a workpiece, a shape of a tool or a kind of a tool set in a CAM at a time of creation of the program.

4. The numerical controller according to claim 1, wherein the machining condition further includes at least any of an override condition an acceleration/deceleration parameter condition, an on/off condition of smoothing, a tolerance condition of smoothing, a compensation function condition of a tool, a change/compensation condition of an end position, an on/off condition of a lifetime counter, a spindle rotational speed, and a feed speed.

5. The numerical controller according to claim 1, wherein the machining information is directly described as a symbol in the program.

* * * * *